No. 785,851. PATENTED MAR. 28, 1905.
C. C. BALDERSTON & N. H. BROWN.
REFLECTING LANTERN.
APPLICATION FILED SEPT. 28, 1904.
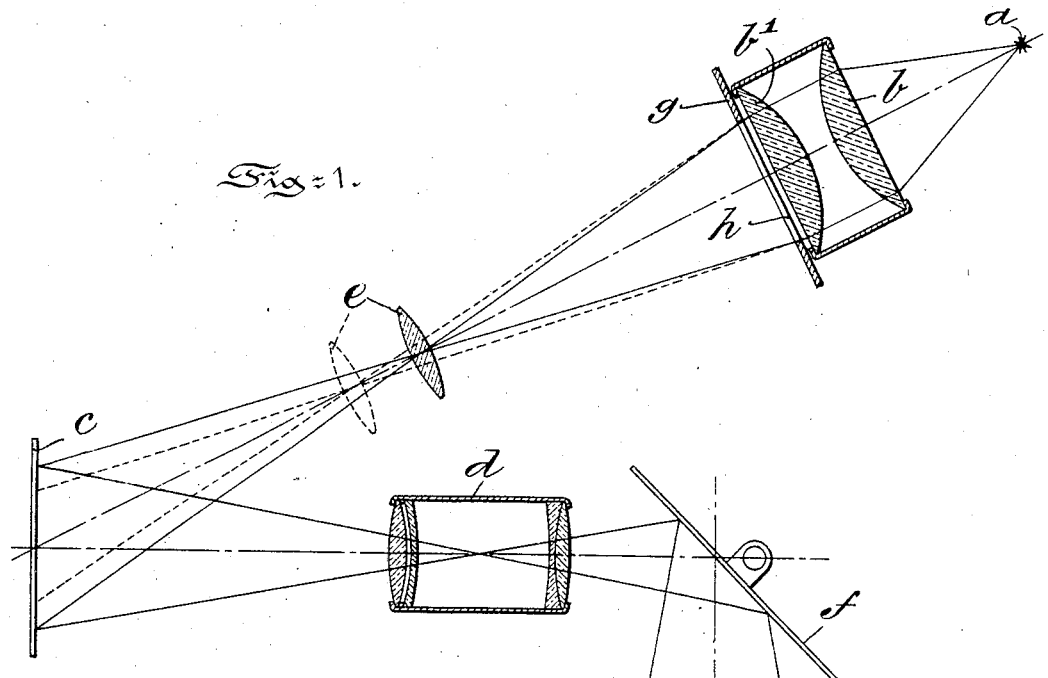
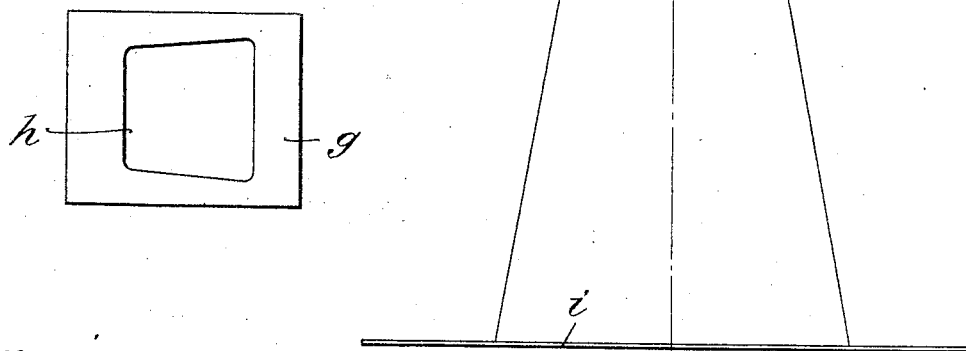

No. 785,851.

Patented March 28, 1905

UNITED STATES PATENT OFFICE.

CALEB C. BALDERSTON, OF COLORA, MARYLAND, AND NATHANIEL H. BROWN, OF PHILADELPHIA, PENNSYLVANIA, ASSIGNORS TO HENRY S. WILLIAMS, NATHANIEL HOWLAND BROWN, AND MORRIS EARLE, OF PHILADELPHIA, PENNSYLVANIA, TRADING THEREAT AS WILLIAMS, BROWN & EARLE.

REFLECTING-LANTERN.

SPECIFICATION forming part of Letters Patent No. 785,851, dated March 28, 1905.

Application filed September 28, 1904. Serial No. 226,349.

*To all whom it may concern:*

Be it known that we, CALEB C. BALDERSTON, residing at Colora, in the county of Cecil and State of Maryland, and NATHANIEL H. BROWN, residing at the city of Philadelphia, in the county of Philadelphia and State of Pennsylvania, citizens of the United States, have jointly invented certain new and useful Improvements in Reflecting-Lanterns, of which the following is a specification.

Our invention has relation to reflecting-lanterns, and in such connection it relates more particularly to means for evenly or uniformly illuminating a picture or object to be shown, to correct the angular position of the object or picture with respect to the illuminating means on a screen upon which the object or picture is projected, and to reverse the picture or object in its projection on such screen.

Hitherto in reflecting-lanterns the picture or object to be shown was illuminated by the light passing through condensing-lenses. By this illumination the image of the source of light was thrown upon the picture or object and generally much out of focus, as well as varied in brightness—that is, brighter in the center or toward the edges.

The principal objects of our invention are therefore, first, to overcome these objectionable features in reflecting-lanterns and to produce an even or uniform illumination of a picture or object to be shown; second, to provide a lens or a combination of lenses between the condensing-lenses and the picture or object to form an image of the illuminated surface of the front condensing-lens upon the picture or object; third, to provide a diaphragm through which the light of the condensing-lenses is conveyed to produce a picture of approximately rectangular outline on a screen, and, fourth, to provide reflecting means to reverse the picture and to reflect the same in a reversed position in its projection on the screen.

The nature and scope of our invention will be more fully understood from the following description, taken in connection with the accompanying drawings, forming part hereof, in which—

Figure 1 is a diagrammatic view, partly in elevation and partly in section, of a reflecting-lantern embodying main features of our invention; and Fig. 2 is a side elevational view of a diaphragm employed in conjunction with the latern and forming one of the features of our invention.

Referring to the drawings, with special reference to Fig. 1, $a$ represents the source of light, and $b$ and $b'$ condensing-lenses, both arranged in the usual well-known manner in a projecting-lantern.

$c$ represents the picture or object to be shown arranged in an oblique position to the condensing-lenses $b$ and $b'$, but at right angles to the optical axis of the objective $d$. The source of light $a$, the condensing-lenses $b$ and $b'$, and the objective $d$ are enveloped in a housing of well-known construction. (Not shown.) Between the front condensing-lenses $b'$ and the picture or object $c$ is arranged a lens $e$, which hereinafter will be called the "illuminating-lens." This illuminating-lens is placed in a movable portion of the housing, (not shown,) so that the same may occupy various positions with respect to the front condensing-lens $b'$ and the picture or object $c$. In order to illuminate the entire surface of the picture or object $c$, the illuminating-lens $e$ is in an intermediate position between the condensing-lenses $b$ and $b'$ and the picture or object $c$ which it is desired to display, the face of the condensing-lens $b'$ and the picture or object being in the conjugate focuses of the illuminating-lens, as indicated in Fig. 1. By the arrangement of the illuminating-lens $e$ and the source of light $a$ in the conjugate focuses of the condensing-lenses $b$ and $b'$ all the light passing through the condensing-lenses will be collected in the illuminating-lens $e$, enabling it to throw a brilliant image of the face of the lens $b'$ upon the picture or object $c$, forming thereon an evenly-illuminated image of uniform brightness throughout its entire surface. An image of the picture thus illuminated may be projected directly upon a screen $i$ by the objective-lens $d$. However, such a picture, as is well known, is reversed right and left on the screen $i$. To correct this objectionable feature, a mirror $f$ is placed in front of the objective $d$ in such a position that the light from the objective $d$ is reflected once before reaching the screen $i$. Thus the picture or object $c$ will appear on the screen $i$ in its natural right and left position. In order to vary the size of the illuminated picture $c$ and to project only a certain portion thereof upon the screen $i$, the illuminating-lens $e$ is shifted from the position indicated in full lines to the position indicated by dotted lines in Fig. 1. By this movement of the illuminating-lens $e$ the operator is enabled to concentrate his entire light on a larger or smaller picture, as desired. The picture or object $c$ occupying a position at right angles to the objective $d$ must necessarily occupy an oblique position with respect to the illuminating-lens $e$ and the condensing-lenses $b$ and $b'$, which are arranged as close as possible to the objective $d$. One side of the illuminated picture $c$ will thus be farther away from the illuminating-lens $e$ than the other side, and the picture projected upon the screen $i$ will therefore appear distorted on the same. In order to correct this distorted image of the picture on the screen $i$ and to produce a picture of approximately rectangular outline on the same, a diaphragm $g$ is placed, preferably, in close proximity to the front condensing-lens $b'$. As shown in Fig. 2, the central portion of the diaphragm is cut out to produce an opening $h$ in the shape of a trapezoid. The image of the illuminated face of the front condensing-lens $b$ must traverse this opening $h$ before reaching the illuminating-lens $e$ and picture or object $c$. By doing so the image of the face of the front condensing-lens $b'$ appears in the shape of a trapezoid on the picture or object $c$, which trapezoidal outline, however, is corrected by the oblique position of the picture $c$, so that the same when projected upon the screen $i$ by the objective $d$ will appear in an approximately rectangular outline.

Instead of using one illuminating-lens $e$ a combination of such lenses may be employed with equally good results and without departing from the spirit and scope of our invention.

Having thus described the nature and objects of our invention, what we claim as new, and desire to secure by Letters Patent, is—

1. The combination, in a reflecting-lantern, of a source of light, condensing-lenses arranged in proximity to the source of light, an illuminating-lens, a picture or object to be illuminated arranged adjacent to the illuminating-lens, and an objective-lens adapted to project the image of the picture or object.

2. The combination, in a reflecting-lantern, of a source of light, condensing-lenses for a picture or object to be illuminated, a diaphragm arranged between the picture or object and the condensing-lenses, and an illuminating-lens disposed between the condensing-lenses and picture or object, substantially as and for the purposes described.

3. The combination, in a reflecting-lantern, of a source of light, condensing-lenses for a picture or object to be illuminated, an illuminating-lens interposed between said condensing-lenses and the picture or object, a diaphragm disposed between the picture or object and the condensing-lenses and an objective-lens for throwing the image of the picture or object upon a screen or other structure, substantially as and for the purposes described.

4. The combination, in a reflecting-lantern, of a source of light, condensing-lenses for a picture or object to be illuminated, an illuminating-lens disposed between the condensing-lenses and the picture or object, a diaphragm having a defined opening, said diaphragm disposed between the picture or object and said condensing-lenses and an objective-lens for throwing the image of the picture or object upon a screen or other structure, substantially as and for the purposes described.

In testimony whereof we have hereunto set our signatures in the presence of two subscribing witnesses.

CALEB C. BALDERSTON.
NATHANIEL H. BROWN.

Witnesses:
J. WALTER DOUGLASS,
THOMAS M. SMITH.